No. 693,874. Patented Feb. 25, 1902.
J. LIPKOWSKI.
OPERATING MECHANISM FOR COMPRESSED AIR BRAKES.
(Application filed Dec. 22, 1900.)

(No Model.) 2 Sheets—Sheet 1.

WITNESSES:
F. W. Wright
M. H. Miller

INVENTOR
JOSEPH LIPKOWSKI
BY Howson & Howson
HIS ATTORNEYS.

No. 693,874. Patented Feb. 25, 1902.
J. LIPKOWSKI.
OPERATING MECHANISM FOR COMPRESSED AIR BRAKES.
(Application filed Dec. 22, 1900.)
(No Model.) 2 Sheets—Sheet 2.

WITNESSES:
F. W. Wright
M. H. Miller

INVENTOR
JOSEPH LIPKOWSKI
BY Hawson & Hawson
HIS ATTORNEYS

UNITED STATES PATENT OFFICE.

JOSEPH LIPKOWSKI, OF PARIS, FRANCE, ASSIGNOR TO THE SOCIÉTÉ GÉNÉRALE DES FRENIS LIPKOWSKI, OF PARIS, FRANCE.

OPERATING MECHANISM FOR COMPRESSED-AIR BRAKES.

SPECIFICATION forming part of Letters Patent No. 693,874, dated February 25, 1902.

Application filed December 22, 1900. Serial No. 40,804. (No model.)

*To all whom it may concern:*

Be it known that I, JOSEPH LIPKOWSKI, engineer, a subject of the Emperor of Russia, residing in Paris, France, have invented an Operating Mechanism for Compressed-Air Brakes, of which the following is a specification.

This invention relates to compressed-air brakes, and has for its object to provide mechanism arranged in such a manner that the reductions of pressure produced in the general conduit at the moment at which the brakes are applied are absolutely determined by the driver by means of the actuating-cock.

With my improved mechanism the various positions of the actuating-lever corresponding to the different degrees of tightening of the brakes are absolutely determined in advance, and the driver is no longer obliged to proceed by making successive trials. He is able to place the operating-lever without hesitation upon one or other of the stop-notches and is certain of obtaining the degree of application of the brakes absolutely corresponding therewith.

In order that the invention may be readily understood and carried into effect, I will describe the same fully with reference to the accompanying drawings, in which—

Figure 1:
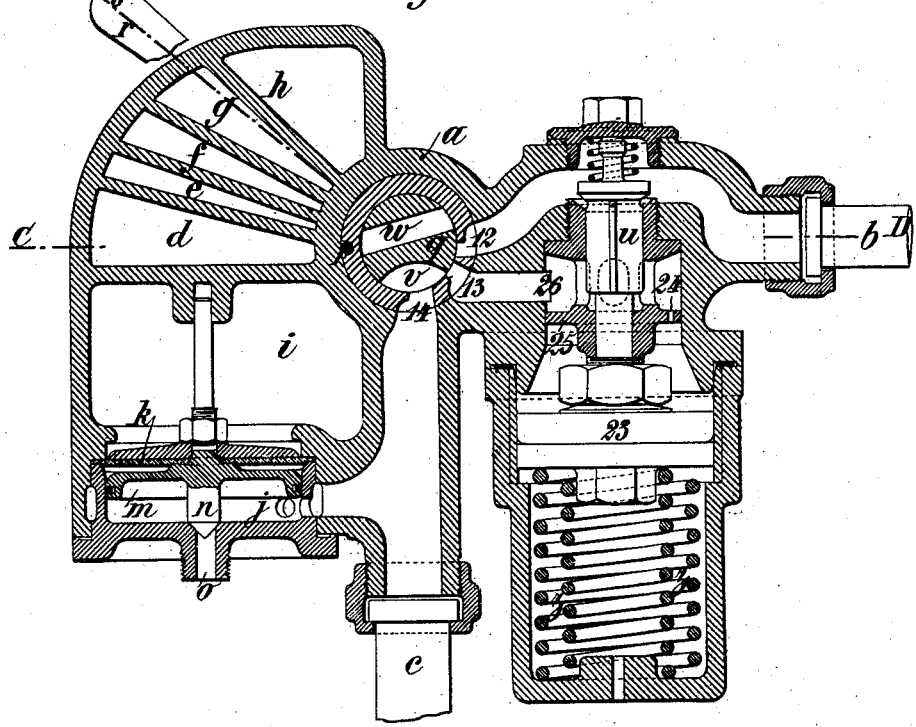
Figure 2:
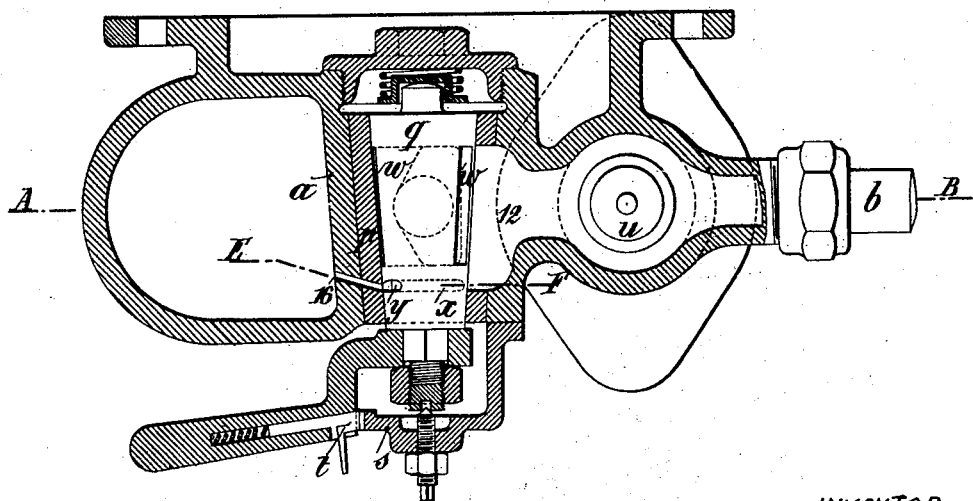
Figure 3:
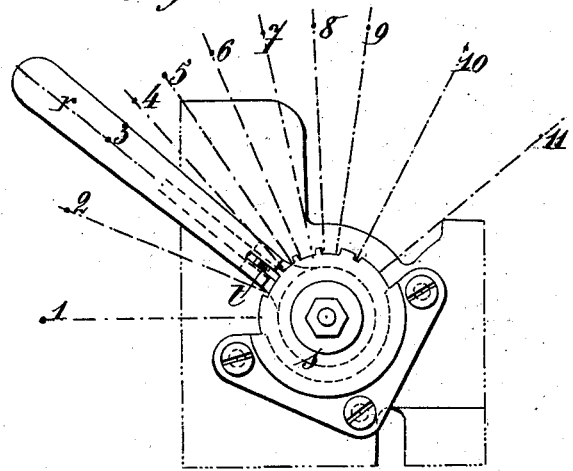
Figure 6:
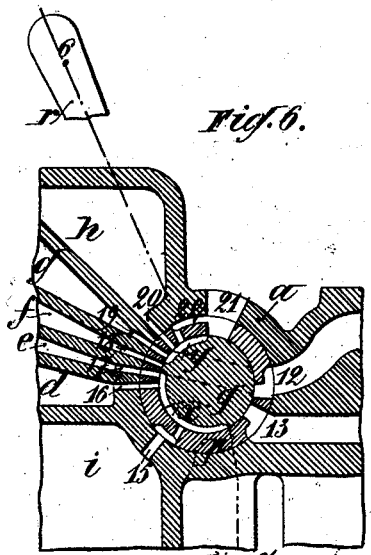
Figure 4:
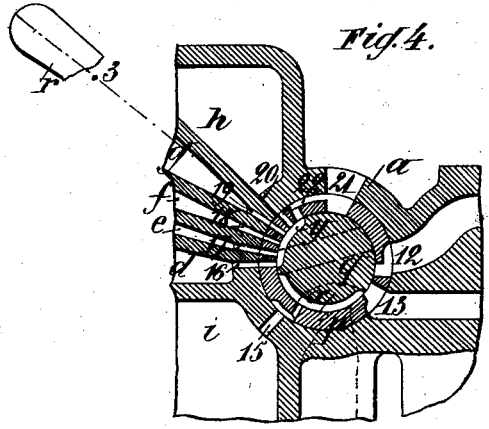
Figure 7:
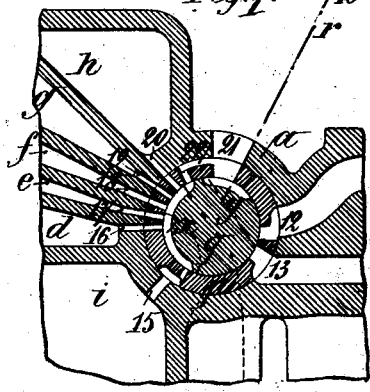
Figure 5:
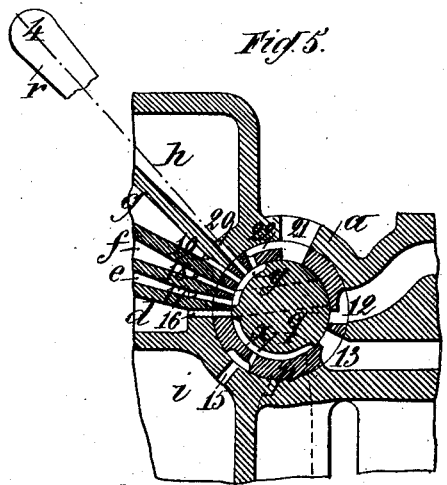
Figure 8:
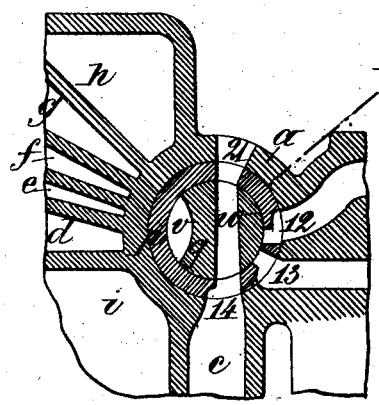

Figure 1 is a vertical section upon the line A B of Fig. 2. Fig. 2 is a horizontal section on the line C D of Fig. 1. Fig. 3 is an external elevation of a portion of the apparatus. Fig. 4 is a partial vertical section on the line E F of Fig. 2. Fig. 5 is a view similar to Fig. 4, but with plug and handle advanced to position 4. Fig. 6 is a view similar to Figs. 4 and 5, but with the plug and handle advanced to position 6. Fig. 7 is similar to the three preceding views with the plug and handle still farther advanced into position 10; and Fig. 8 is a view of the plug and valve on the same line on which Fig. 1 is shown, but with the handle in the last position 11, connecting the train-pipe with the atmosphere.

The operating mechanism represented in Figs. 1, 2, and 3 comprises a cock, the socket $a$ of which is interposed, together with a pressure-regulator, between the conduit $b$, which conducts the compressed air from the reservoir of the locomotive, and the general conduit $c$, which extends throughout the length of the train and into which the compressed air is conducted by the cock; superposed compartments $d$, $e$, $f$, $g$, and $h$, which radiate around a portion of the socket $a$, each of which compartments is of different volume, and an auxiliary reservoir below the compartment $d$, subdivided into two parts $i$ and $j$, separated by a flexible diaphragm $k$, of which reservoir the part $i$ may be placed in communication by means of the socket $a$ either with the conduit $b$ of the reservoir of the locomotive or with one of the said compartments, while the other division $j$ comprises a piston $m$, which is rigidly connected with a valve $n$, serving to place the general conduit $c$ in communication with the atmosphere by means of the aperture $o$. The socket $a$ of the said cock may be provided with an internal liner $p$, in which a plug $q$, provided with an operating-handle $r$, is capable of rotation. Opposite this handle is arranged a sector $s$, which is fixed to the socket and of which the periphery comprises notches for the handle. The different positions which the handle is able to assume by means of these notches are eleven in number and are marked 1 to 11, Fig. 3. The handle is securely maintained in each position by means of a spring-pawl $t$, arranged in the said handle $r$. The socket $a$ and its liner $p$ are provided with apertures 12, 13, 14, 15, 16, 17, 18, 19, 20, and 21. The apertures 12 and 13 open, respectively, above and below the valve $u$, comprised in the pressure-regulator. The aperture 14 opens into the general conduit $c$. The aperture 15 opens into the part $i$ of the auxiliary reservoir. The apertures 16, 17, 18, 19, and 20 open, respectively, into the compartments $d$, $e$, $f$, $g$, and $h$, and, finally, the aperture 21 opens into the atmosphere; but it will be noticed that it is provided with a small branch 22, the object of which is hereinafter explained. The plug $q$ of the cock is provided with a recess $v$, a mortise $w$, and two partially-circular grooves $x$ and $y$, situated in the same plane. The recess $v$ is intended to establish communication, by means of the apertures 13 and 14, between the air-reservoir of the locomotive and the general conduit $c$.

In certain cases the common communication may be established by means of the apertures 12 and 14. The mortise $w$ serves to establish communication, by means of the apertures 14 and 21, between the general conduit $c$ and the atmosphere. The groove $x$ serves to establish communication, by means of the aperture 13 (12 in certain cases) and 15, between the air-reservoir of the locomotive and the auxiliary reservoir. This communication is effected at the same time as that with the general conduit by means of the recess $v$. The groove $x$ is also adapted to establish communication, through the apertures 15 and 16 or 17, 18, 19, and 20, between the said auxiliary reservoir and one or more of the compartments $d$, $e$, $f$, $g$, and $h$. Finally, the groove $y$ serves to place these compartments in communication with the atmosphere.

The compartments $d$, $e$, $f$, $g$, and $h$ are situated above the auxiliary reservoir, and the diaphragm $k$, which separates the latter into two parts and which only serves to insure perfect tightness, is connected with the piston $m$, which carries a valve $n$.

The pressure-regulator, situated to the right-hand side of the cock, may be of any suitable kind. Preferably it should posess, as above stated, a valve $u$, submitted to the action of springs $z$, acting upon a piston 23, upon the upper surface of which the compressed air reaching the said surface through the orifice 24 in the partition 25 is able to act. The partition 25 is situated below the conduit 26, terminating at the aperture 13 of the socket $a$ of the cock.

The operation of the apparatus described above is as follows: Under normal conditions—that is to say, when the brakes are inoperative—the handle $r$ occupies the position marked 3—that is, the plug of the cock places the general conduit in communication with the reservoir of the locomotive, Fig. 1, in such a manner that the compressed air from this latter passes the valve $u$, raised by the action of the springs $z$, and through the conduit 26, the aperture 13, and the notch $v$ fills the said general conduit $c$. It will be noticed that the compressed air also reaches the piston 23 of the regulator, passing through the orifice 24, and that at the same time it fills the part $i$ of the auxiliary reservoir, passing through the aperture 13, the groove $x$, and the aperture 15, Fig. 4. Immediately the air-pressure in the general conduit has become sufficient to overcome the resistance of the springs $z$ the piston 23 descends and the valve $u$ closes. There is, therefore, in the general conduit a constant pressure, which may be readily determined in advance by means of the springs $z$. If for any reason the pressure becomes less, the springs $z$ would cause the piston 23 to rise and would again open the valve $u$, so as to compensate for the loss of pressure. We will now assume that the handle $r$ occupies the position 4, Fig. 5. This position is that of isolation—that is to say, that in which the auxiliary reservoir $i$ and the general conduit $c$ are completely cut off both from the pressure-regulator and from the atmosphere, the apertures 12, 13, and 21 being closed. If the handle is caused to assume the position 6, for example, Fig. 6, it will be seen that the reservoir $i$ is placed in communication, by the groove $x$, with the compartments $d$ and $e$, and that as a result of this the air contained in the said reservoir is reduced in pressure to such an extent that the piston $m$ is raised and the air of the general conduit $c$ escapes into the atmosphere, passing through the orifice $o$, which has been uncovered, until the pressure in the general conduit is absolutely equal to that of the air contained in the reservoir $i$. In short, it will be seen that by placing the operating-handle in the various positions 5, 6, 7, 8, and 9 the reservoir $i$ communicates with the different compartments $d$, $e$, $f$, $g$, and $h$, respectively, and that in this manner different degrees of expansion which are absolutely predetermined are obtained. These different degrees of expansion are established in such a manner as to produce in the general conduit reductions of pressure varying, for example, between 0.500 kilogram and one kilogram, these limits being those of compressed-air brakes of the most approved kinds; but it is obvious that there is nothing fixed about these limits nor about the number of reductions of pressure which it is possible to produce between such limits. In all cases these various degrees of expansion produce in an absolutely precise manner and without any trials upon the part of the driver being necessary the various degrees of application of the brakes strictly as predetermined.

Moderate application is obtained by placing the handle $r$ upon the position 10, Fig. 7, in which the reservoir $i$ is in communication with the atmosphere by means of the small branch 22.

Sudden application is obtained in the position 11, Fig. 8, in which the general conduit $c$ communicates directly with the atmosphere.

Besides the positions above described—that is to say, the normal position 3, position of isolation 4, positions of graduated application 5, 6, 7, 8, and 9, position of moderate application 10, and position of sudden application 11—the operating mechanism also permits of two other positions 1 and 2 for the handle $r$ of the actuating-cock. The position 1 is that which is suitable for releasing brakes of the Westinghouse, New York, and Schleifer systems, which necessitate an excess of pressure in order to insure their release. This position, in fact, admits into the general conduit $c$ the air from the reservoir of the locomotive which has not yet been expanded by the regulator. The position 2 is that which is suitable for the release of brakes of the Lipkowski system. This position, in fact, establishes complete registration between the apertures 13 and 14 in such a manner that the air having passed through the pressure-regulator enters the general conduit $c$ freely and insures the release of the brakes.

I claim as my invention—

1. Operating mechanism for compressed-air brakes, comprising a source of air-supply, a general conduit, a valve-controlled opening therefrom to the atmosphere, an auxiliary reservoir and expansion-chambers, means to control said opening by the pressure in the auxiliary reservoir, a cock between the source of supply, and the general conduit and reservoir, and having a notch adapted to connect the source of supply with the general conduit, a mortise adapted to connect the general conduit with the atmosphere, a groove adapted to connect the source of supply with the auxiliary reservoir in its first position and the reservoir with the expansion-chambers in its subsequent positions, another groove to connect the expansion-chambers not connected with the reservoir, with the atmosphere, all substantially as and for the purpose described.

2. Operating mechanism for air-brakes, comprising a train-pipe, an auxiliary reservoir, expansion-chambers, a socket, a single opening from each of the above-named reservoir and chambers to the socket, a source of supply, a diaphragm having a valve adapted to open the train-pipe to the atmosphere, a cock in the socket, having a notch adapted to connect the source of supply with the train-pipe, and a groove, in two parts, one part adapted to connect the auxiliary reservoir with the source of supply and afterward with the expansion-chambers, the second part adapted to open those expansion-chambers not connected with the reservoir to the air, substantially as described.

3. Operating mechanism for air-brakes comprising a train-pipe, an auxiliary reservoir, expansion-chambers, a socket, a single opening from each of the above-named reservoir and chambers to the socket, a source of supply, a diaphragm, having a valve adapted to open the train-pipe to the atmosphere, a cock in the socket, having a notch adapted to connect the source of supply with the train-pipe, and a groove, in two parts, one part adapted to connect the auxiliary reservoir with the source of supply and afterward with the expansion-chambers, the second part adapted to open those expansion-chambers not connected with the reservoir to the air, and a channel $w$ adapted to connect the train-pipe with the air substantially as described.

4. Operating mechanism for compressed-air brakes comprising a source of supply, a train-pipe passage, a valve $n$ in the train-pipe passage opening direct to the air, a socket and a cock having grooves, said source of supply opening on one side of the socket, and said train-pipe opening substantially at right angles thereto, in combination with a casing on the opposite side of the socket from the source of supply opening divided into compartments, the lowermost compartment comprising an auxiliary reservoir and having a diaphragm to operate said valve, an opening from the reservoir to the socket, the other compartments being radially arranged in the casing above the said reservoir and each having an opening to the socket, substantially as described.

5. Operating mechanism for compressed-air brakes, comprising a socket, a cock, grooves therein, an opening at the top of the socket to the air and at the bottom to the train-pipe, one of said grooves adapted to connect said top opening and train-pipe, a source of pressure-supply opening between them, a casing on the side opposite the source of supply and comprising an auxiliary reservoir and radially-arranged superposed chambers, each having an opening to the socket, a diaphragm in the reservoir, and a valve controlled thereby to open the train-pipe to the atmosphere, as and for the purpose described.

In testimony whereof I have signed my name to this specification in the presence of two subscribing witnesses.

JOSEPH LIPKOWSKI.

Witnesses:
B. H. DE LARNAGE,
LEON FRANCKEN.